May 22, 1956  R. NISTRI  2,746,165
SPHERICAL HOUSING TYPE COMPASS, ESPECIALLY
SUITABLE FOR USE ON AIRCRAFT
Filed Jan. 29, 1953
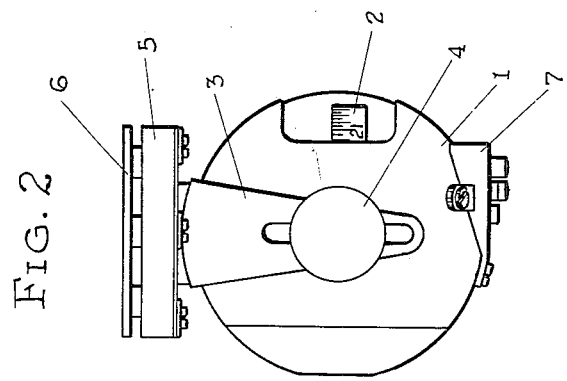
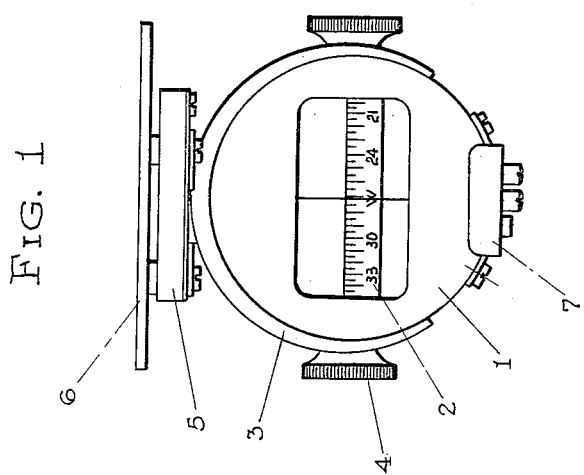
INVENTOR
RAFFAELLO NISTRI
BY Bertram Ottinger
ATTORNEY United States Patent Office 2,746,165
Patented May 22, 1956

2,746,165
SPHERICAL HOUSING TYPE COMPASS, ESPECIALLY SUITABLE FOR USE ON AIRCRAFT

Raffaello Nistri, Rome, Italy

Application January 29, 1953, Serial No. 333,945

Claims priority, application Italy February 23, 1952

1 Claim. (Cl. 33—222)

In the installation of direct reading type magnetic compasses on aircraft, difficulties are often met with due to the fact that the compass must be located in such a position that, in addition to permitting easy reading of the graduations by the pilot, the magnetic fields of the aircraft itself, in the area where the compass is located (both the field itself and the induced field) are of a sufficiently low intensity to be compensated by the normal devices with which compasses are usually provided.

In addition to this it is necessary that the structure to which the compass must be applied does not transmit vibrations of amplitude or frequency such as to disturb the magnetic response, or at least such as not to be absorbable by suitable anti-vibration supports.

It is not always possible, in designing an airplane, to take all these circumstances into quantitative account, with the result that there is often the need to seek a position for the compass on the aircraft such as to meet the above mentioned requisites in the best manner possible.

This takes place especially in the case of orientation compasses which are applied in addition to the normal navigation instruments for safety reasons or for temporary needs.

This application requires that the compass be mounted without difficulty on the aircraft, whatever the form, position and orientation of the structure to which it is convenient to apply the compass; this leads to the requirement that the base, in other words the system of supporting the compass, be orientable in any direction in space, while at the same time permitting the compass needle to assume its normal position.

The present invention concerns the particular form given to the compass housing, so that the supporting base can assume any orientation in relation to the compass, this having been obtained by giving the housing a perfectly spherical form. It is evident that a base of any form suitable for carrying within itself the sphere which constitutes the housing, permits the compass card to be maintained in its normal position, while itself assuming any orientation.

As an example, one of the forms in which this invention may be realized is here indicated.

Figs. 1 and 2 are front and side views, respectively, of a compass embodying my invention.

In the attached drawing, 1 indicates the housing of spherical shape which may be supported by a support consisting of an attachment plate 6 and a stirrup the arms of which 3 have slots in which the screw buttons 4 which fasten the housing ot the stirrup itself may move.

The stirrup is attached to the plate 6 by means of an anti-vibration suspension consisting of a rubber ring 5; in addition, the stirrup can rotate in relation to plate 6 by means of a device which can be tightened, as for example by securing the stirrup 3 to the plate 6 with a set of "springs," i. e. rubber anti-vibration elements, such as shown in U. S. L. P. 2,353,952 to Felix L. Yerzley, dated July 18, 1944.

It can be seen how the base 6 which is to be applied to the structure of the aircraft, may assume within wide limits any position in space while at the same time always maintaining the axis of rotation of the compass card in a vertical plane, and the reference lines for reading the graduated zone 2 in an established orientation. In fact, the plate 6 can rotate around an axis at right angles to its own plane, around a horizontal axis passing through the fastening buttons 4 and around an axis at right angles to the latter axis by means of the slots in the arms.

Other forms of support may be imagined, having the possibility of giving the housing freedom of rotation in every sense, as well as unlimited amplitude, such, for example, as a cage type support within which the sphere forming the housing is carried.

A compensating box 7 is applied to the housing, said box, because of its very reduced dimensions, being of no obstacle to the orientation of the housing itself; the possibility has also been considered of applying said box to the upper part of the housing when installation requires that the plate 6 be at the bottom.

What I claim is:

For a magnetic orientation compass, a mounting to support said compass on variously positioned surfaces in a manner such as to dispose the compass with its axis of rotation vertical, said mounting comprising a spherical housing for the compass, an attachment plate adapted to be secured to a surface, a stirrup having curved arms the inner surfaces of which match the external surface of the spherical housing, said arms conjointly extending over an arc substantially greater than 180°, said housing being embraced by said arms, said arms having coplanar slots the centers of which are substantially diametrically opposed, pins extending from said housing through said slots, said pins being in alignment and diametrically opposed, said pins being perpendicular to the axis of rotation of the compass, means for disengageably fixing said pins in any position in the slots, said pins when disengaged being slidable in the slots to permit rotation of the housing about the axis of the pins and about an axis perpendicular to the plane of the slots, and an anti-vibration suspension securing the stirrup to the attachment plate for selective rotation about an axis perpendicular to both the aforesaid axes of rotation.

References Cited in the file of this patent

UNITED STATES PATENTS

| | | |
|---|---|---|
| 2,300,710 | Sperry | Nov. 3, 1942 |
| 2,353,952 | Yerzley | July 18, 1944 |
| 2,455,891 | Flanagan | Dec. 7, 1948 |
| 2,513,044 | Page | June 27, 1950 |
| 2,634,702 | Rowe | Apr. 14, 1953 |

FOREIGN PATENTS

| | | |
|---|---|---|
| 300,518 | Germany | Sept. 4, 1917 |